United States Patent [19]

Lindgren et al.

[11] Patent Number: 4,714,659
[45] Date of Patent: Dec. 22, 1987

[54] THERMAL PROTECTIVE SHIELD

[75] Inventors: Håkan Lindgren; Björn Anderson, both of Hallstahammar, Sweden

[73] Assignee: Bulten-Kanthal AB, Hallstahammar, Sweden

[21] Appl. No.: 645,742

[22] PCT Filed: Dec. 29, 1983

[86] PCT No.: PCT/SE83/00485
§ 371 Date: Aug. 27, 1984
§ 102(e) Date: Aug. 27, 1984

[87] PCT Pub. No.: WO84/02763
PCT Pub. Date: Jul. 19, 1984

[30] Foreign Application Priority Data

Dec. 30, 1982 [SE] Sweden .................................. 8207507

[51] Int. Cl.[4] .............................................. B32B 15/00
[52] U.S. Cl. ..................................... 428/685; 428/682; 428/683; 428/684; 428/679; 228/263.15
[58] Field of Search ............... 428/682, 683, 684, 685, 428/679, 637, 638, 920, 940, 921; 244/158 A, 121, 133; 432/65, 249, 253; 75/124 F, 174 P; 228/190, 263.13, 263.15

[56] References Cited

U.S. PATENT DOCUMENTS

| 3,343,928 | 7/1967 | Bellis et al. | 428/682 |
| 3,861,146 | 1/1975 | Lynch et al. | 60/524 |
| 4,034,142 | 7/1977 | Hecht | 428/678 |
| 4,144,380 | 3/1979 | Beltran et al. | 75/124 |
| 4,172,363 | 10/1979 | Bex | 60/517 |
| 4,198,442 | 4/1980 | Gupta et al. | 428/679 |

FOREIGN PATENT DOCUMENTS

| 631985 | 6/1936 | Fed. Rep. of Germany . |
| 1195054 | 6/1965 | Fed. Rep. of Germany . |
| 1200552 | 9/1965 | Fed. Rep. of Germany . |
| 1240672 | 5/1967 | Fed. Rep. of Germany . |
| 5610990 | 3/1981 | Japan ............................... 428/685 |

Primary Examiner—L. Dewayne Rutledge
Assistant Examiner—Deborah Yee
Attorney, Agent, or Firm—Pollock, Vande Sande & Priddy

[57] ABSTRACT

Thermal protective shield to be used in connection with hot gases in engines, particularly for the combustion of solid, liquid or gaseous fuels or in e.g. Stirling engines driven by solar energy. The thermal protective shield consists of a multi-layer material, wherein at least two layers are joined to each other over a surface corresponding to the entire surface exposed to the hot gases, and wherein the outer layer facing the hot gas consits of an alloy of the type iron-chrome-aluminium. Preferably, the layers are joined together by hot-rolling.

4 Claims, 1 Drawing Figure

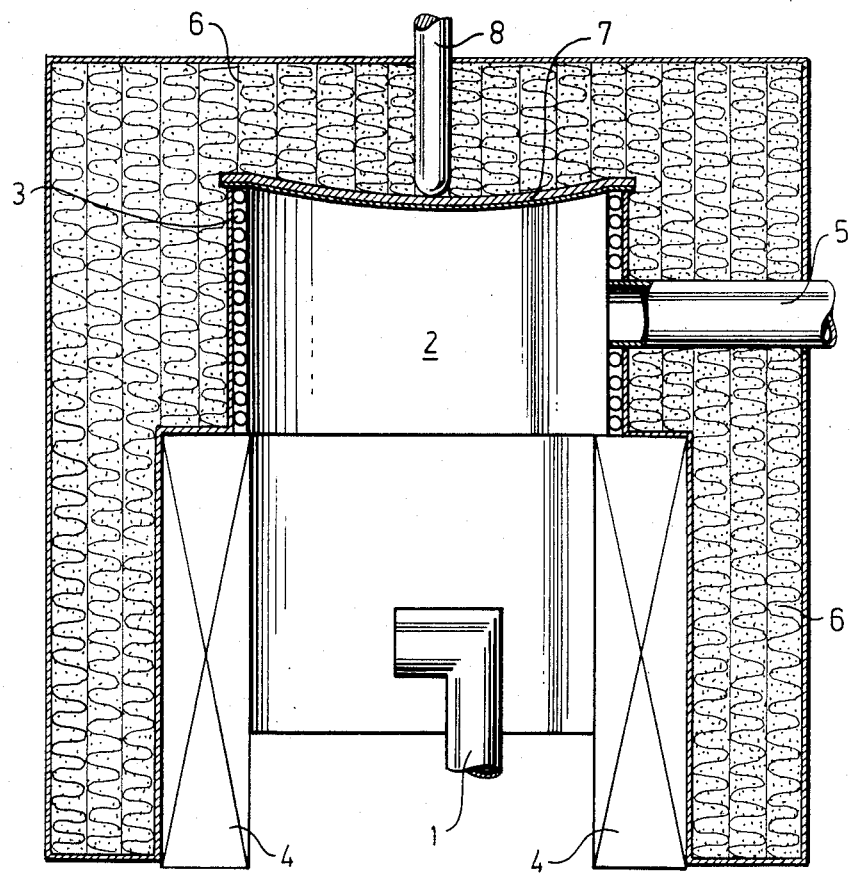

THERMAL PROTECTIVE SHIELD

The present invention relates to a thermal protective shield to be used for hot gases in machinery. Primarily, the invention refers to a flame protective shield to be used in connection with the combustion of solid, liquid or gaseous fueld. Other possible fields of application are e.g. in Stirling engines driven by solar energy. The invention also relates to a method of manufacturing such a thermal protective shield and the use of the same in the special application constituted by a Stirling engine. As is recognized in the art, a Stirling engine is an external combustion engine in which heat released from burning fuel is transferred to a confined gas which activates pistons.

Thermal protective shields of different kinds are used in connection with combustion for various purposes. The necessity of special thermal protective shields appears only at the highest temperatures occuring in connection with combustion. When developing new engine types and improving known types for achieving higher efficiency, there is also a desire to increase the working temperatures and thus the temperature of the materials used. In addition to the temperature, a flame protective shield must resist the influence of combustion gases and, in certain applications, meet the requirements of mechanical strength. The term flame protection does not imply that the shield should be directly exposed to a flame resulting from the combustion. In many applications, the major part of the transfer of heat to the protective shield is constituted by radiation. In other applications, the transfer of heat is entirely effected by radiation, e.g. in case of collecting solar energy.

A plurality of different materials for heat shields have been tested previously and even found a certain use. Among these materials, various high temperature resistant alloys could be mentioned, which alloys are usually based on nickel or cobalt. As far as these material have met the technological requirements, however, it has turned out that these materials are expensive and in many cases difficult to obtain. Therefore, they are not suitable for mass production.

In trying to avoid the above-mentioned difficulties in connection with high temperature resistant alloys, materials consisting of several layers have been tested. A material, which is satisfactory from the mechanical point of view, has been coated on the side to be facing the combustion chamber or the like with a ceramic, high temperature resistant material. The coating is applied by thermal spraying, e.g. flame spraying or plasma spraying. As an example of coating materials zirconium oxide can be mentioned. In connection with these multilayer materials, however, problems have arisen, primarily due to the different thermal expansion coefficients of the substrate and the coating. This may result either in crack formations in the coating material or in a tendency of the coating to loosen entirely or partly from the substrate. The problems have been increased in that, due to the high temperature in the combustion chamber and the relatively bad characteristics of the substrate at high temperatures, the coatings are necessarily made relatively thick.

The present invention concerns a thermal protective material consisting of several layers of such a kind that the above-mentioned problems are avoided, whereas satisfactory mechanical and physical characteristics are obtained. According to the invention, the thermal protective shield comprises at leasat two layers, wherein the outer layer facing the hot gases in the combustion chamber or the like consists of an alloy of the iron-chrome-aluminium-type. The latter is connected over a surface fully corresponding to the surface exposed to the combustion gases, to another material having sufficient mechanical characteristics at high temperatures to meet the requirements of the thermal protective shield. The material is produced by connecting two shields so as to avoid enclosed oxides and pores being obtained to a great extent when coating by means of thermal spraying. By producing the thermal protection out of metallic shields, which are connected to each other in several layers, one may also choose the thickness of the layer at will without any special problems.

The invention will be described further below with reference to an example concerning the use of a thermal shield in a Stirling engine. FIG. 1 shows schematically the combustion chamber in such an engine. The fuel may be in a solid, liquid or gaseous state and is supplied through a channel (1) to the combustion chamber (2). In the upper part of the combustion chamber there is a heat exchanger (3) which may entirely enclose this part of the cylindrical combustion chamber. Furthermore, there are exhaust channels (4) and channels for the working medium (5). The combustion chamber is surrounded by insulating material (6). The thermal shield (7) is situated at the top of the combustion chamber and is kept in place by a pressing member (8). In the shown example, the thermal protective shield consists of two materials, there being a layer of iron-chromium-aluminium directly facing the combustion chamber and having a thickness of a little more than 1 mm, this layer being united, over its entire surface, with a four mm thick layer of an alloy containing appr. 40% nickel (here and in the following % means percent per weight). The iron-chromium-aluminum layer contains, by weight, 15–25 percent chromium, 3–8 percent aluminum and no more than about 2 percent of other substances as additions or impurities. The resistance requirements of the thermal shield are very high. The flame temperature may reach 2000° C., and the temperature of the gas adjacent to the thermal shield amounts to 1700°–1800° C. The outer temperature of the thermal shield is then 1300°–1400° C. The combustion in the Stirling engine takes place with excess oxygen which secures the creation and maintenance of a protective aluminum oxide layer on the surface of the thermal shield. A thermal shield with satisfactory characteristics should stand more than 1000 hours of operation under these conditions. This requirement is met quite well by a thermal shield according to the invention.

It is essential that the materials, of which the thermal shield is made, are well joined together all over the surface corresponding to the surface facing the combustion chamber. A loose combination of the same materials or e.g. joining the materials point by point will result in unsatisfactory characteristics as far as mechanical strength and life are concerned. The thermal shield in this example is provided, adjacent to the combustion chamber, with a plate of iron-chromium-aluminium having the composition of appr. 22% chromium, appr. 5% aluminium and the rest mainly iron. Minor additions of other substances, e.g. yttrium or hafnium in the order of some tenth % may occur. Such additions and usual impurities, however, do not amount to more than approximately 2% in total. This plate has been joined by hot rolling with a plate composed of 20% chromium, 35% nickel, the rest mainly iron, even in this case containing usual impurities. The chromium-nickel plate can contain, by weight, 5-80 percent nickel, 15-30 percent chromium, and the rest mostly iron. It has turned out to be possible to join these materials by hot rolling provided that the joining surfaces are cleaned thoroughly before the rolling process and are protected from oxidation by means of a protective gas during the rolling operation.

Other material combinations and production methods in addition to those mentioned in the above example may naturally be considered within the scope of the invention. In certain applications there could be a reason to use a material consisting of more than two layers, and the combination of iron-chromium-aluminium on both outer sides and an intermediate layer of an iron-nickel-chrome alloy has turned out to be useful. It may also be desirable to cover the outer edge around the thermal shield so that the intermediate layer will be entirely enclosed. This can be achieved by covering the edges by means of welding or thermal spraying. It is also feasable to produce the material by cold-rolling. In all these cases, however, it is essential that the plate closest to the combustion chamber consists of an iron-chromium-aluminum alloy which, all over the surface corresponding to the surface facing the combustion chamber, is joined to another plate for obtaining a thermal protection of satisfactory mechanical characteristics.

We claim:

1. A thermal protective shield for protection against hot gases at high operating temperatures comprising at least two layers of which an outer layer for facing the hot gases consists of an alloy containing iron, chromium, and aluminum, characterized in that:

two of said layers consist of plates which are intimately joined together all over a surface corresponding to the entire surface subject to exposure to hot gases;

the outer plate has a thickness of at least about 1 mm and consists of 15-25 weight % chromium, 3-8 weight % aluminum, no more than a total of about 2% of other substances as additives or impurities, and the rest iron; and the plate joined to said outer plate consists of a metal alloy having high mechanical strength at high temperatures.

2. A thermal protective shield according to claim 1 characterized in that the outer layer of iron-chromium-aluminum is joined to a layer consisting of an alloy having the composition of 5-80% Ni, 15-30% Cr, the rest mainly iron.

3. A method of protecting components in a Stirling engine from exposure to hot gases at high operating temperatures comprising providing as a thermal protective shield between said components and said hot gases at least two plates of which an outer plate facing the hot gases has a thickness of at least about 1 mm and consists of 15-25% by weight chromium, 3-8% by weight aluminum, no more than a total of about 2% additives or impurities, and the rest iron, said at least two plates being intimately joined together all over a surface corresponding to the entire surface subject to exposure to hot gases and wherein said plate joined to said outer plate consists of a metal alloy having a high mechanical strength at high temperatures.

4. The method of claim 3 wherein the thermal protective shield consists of at least three layers wherein the two outer layers consist of 15-25% by weight chromium, 3-8% by weight aluminum, a total of no more than about 2% additives or impurities, and the rest iron.

* * * * *